United States Patent
Rabovitser et al.

(10) Patent No.: US 6,517,607 B2
(45) Date of Patent: Feb. 11, 2003

(54) METHOD AND APPARATUS FOR SELECTIVE REMOVAL OF A CONDENSABLE COMPONENT FROM A PROCESS STREAM WITH LATENT HEAT RECOVERY

(75) Inventors: Iosif K. Rabovitser, Skokie, IL (US); Richard A. Knight, Brookfield, IL (US); Robert J. Remick, Bolingbrook, IL (US)

(73) Assignee: Gas Technology Institute, Des Plaines, IL (US)

( * ) Notice: Subject to any disclaimer, the term of this patent is extended or adjusted under 35 U.S.C. 154(b) by 0 days.

(21) Appl. No.: 09/873,569

(22) Filed: Jun. 4, 2001

(65) Prior Publication Data

US 2002/0189446 A1 Dec. 19, 2002

(51) Int. Cl.[7] .............................................. B01D 53/22
(52) U.S. Cl. ........................... 95/52; 95/45; 96/4; 96/9; 96/10
(58) Field of Search ............................... 95/45, 50, 52; 96/4, 7, 9, 10

(56) References Cited

U.S. PATENT DOCUMENTS

| | | | | |
|---|---|---|---|---|
| 3,511,031 A | | 5/1970 | Ketteringham et al. | 55/158 |
| 3,735,559 A | | 5/1973 | Salemme | 55/16 |
| 3,980,605 A | | 9/1976 | Steigelmann et al. | 55/16 X |
| 4,466,202 A | | 8/1984 | Merten | 34/27 |
| 4,583,996 A | | 4/1986 | Sakata et al. | 55/16 |
| 4,586,939 A | | 5/1986 | Li | 55/16 |
| 4,857,081 A | | 8/1989 | Taylor | 55/16 |
| 4,871,461 A | | 10/1989 | Karakane et al. | 210/638 |
| 4,875,908 A | | 10/1989 | Kikukawa et al. | 55/16 |
| 4,900,448 A | * | 2/1990 | Bonne et al. | 95/52 X |
| 5,002,590 A | | 3/1991 | Friesen et al. | 55/16 |
| 5,013,436 A | * | 5/1991 | Lee et al. | 96/10 X |
| 5,034,025 A | * | 7/1991 | Overmann, III | 95/52 |
| 5,071,451 A | | 12/1991 | Wijmans | 55/16 |
| 5,108,464 A | | 4/1992 | Friesen et al. | 55/16 |
| 5,236,474 A | | 8/1993 | Schofield et al. | 95/47 |
| 5,281,254 A | * | 1/1994 | Birbara et al. | 96/7 X |
| 5,282,969 A | * | 2/1994 | Xu | 95/45 X |
| 5,399,188 A | * | 3/1995 | Roberts | 95/52 |
| 5,611,842 A | | 3/1997 | Friesen et al. | 95/50 |
| 5,681,433 A | * | 10/1997 | Friesen et al. | 95/52 X |
| 5,681,842 A | | 10/1997 | Dellaria et al. | 514/367 |
| 5,753,009 A | | 5/1998 | Sirkar et al. | 95/45 |
| 5,827,351 A | * | 10/1998 | Prasad et al. | 95/45 |
| 5,843,209 A | * | 12/1998 | Ray et al. | 95/52 |
| 5,928,409 A | * | 7/1999 | Sirkar | 95/50 X |
| 5,954,858 A | * | 9/1999 | Peretti et al. | 95/45 X |
| 6,036,746 A | * | 3/2000 | Scovazzo et al. | 95/52 |
| 6,059,857 A | * | 5/2000 | Ray et al. | 95/52 |
| 6,355,092 B1 | * | 3/2002 | Jansen et al. | 95/52 X |

FOREIGN PATENT DOCUMENTS

| | | | |
|---|---|---|---|
| DE | 3818919 A | * | 12/1989 |
| EP | 0430331 A | * | 6/1991 |
| EP | 0 532 368 | | 3/1993 |
| JP | 02-211213 A | * | 8/1990 |
| JP | 06-007630 A | * | 1/1994 |
| WO | WO 94/01204 A1 | * | 1/1994 |

* cited by examiner

*Primary Examiner*—Robert H. Spitzer
(74) *Attorney, Agent, or Firm*—Mark E. Fejer

(57) ABSTRACT

A method for removing a condensable component from a process stream in which a first side of a permselective membrane is contacted with the process stream in which is disposed the condensable component. The condensable component is passed through the permselective membrane to a second side of the permselective membrane, forming a condensable permeate. The condensable permeate is then contacted with a liquid stream having a liquid form of the condensable permeate, forming a condensed permeate. The condensed permeate may then be returned to the process which generated the process stream.

20 Claims, 3 Drawing Sheets

METHOD AND APPARATUS FOR SELECTIVE REMOVAL OF A CONDENSABLE COMPONENT FROM A PROCESS STREAM WITH LATENT HEAT RECOVERY

BACKGROUND OF THE INVENTION

1. Field of the Invention

This invention relates to a method and apparatus for the removal of at least one condensable component from a process stream comprising the condensable component in a manner which allows the recovery of its latent heat of vaporization. This invention is applicable to flue gases from boilers or process heaters or to other process streams which contain significant quantities of a condensable component at a temperature above the dew point of the condensable component. More particularly, this invention relates to a method and apparatus in which a vapor-phase component of a process stream, such as water vapor in flue gases, can be returned to the process in liquid form, such as feed water for steam generation, which recovers the latent heat of vaporization.

2. Description of Prior Art

Many industrial processes produce process streams containing condensable components, such as water vapor and volatile organics. Typically, it is desirable to remove and recover these condensable components from the process streams for environmental and/or economic reasons. In addition, it is also desirable to recover the latent heat of vaporization associated with such condensable components as a means for reducing process energy requirements. The use of heat exchanger-based condensers for the recovery of condensable components of process streams and the latent heat of vaporization associated therewith is well known to those skilled in the art.

Methods and apparatuses for the selective removal of one or more components from a gaseous mixture are well known. U.S. Pat. No. 5,753,009 teaches a method and apparatus for selective removal of one or more components from a multi-component gas/vapor mixture by membrane fractionation. The membrane fractionation gas removal system comprises a feed chamber containing the gas/vapor mixture, at least one porous membrane having a first side which contacts the gas/vapor mixture in the feed chamber, at least one non-porous membrane having one side which contacts the second side of the porous membrane, which non-porous membrane has a permeability selective to one or more components of the gas/vapor mixture, an exit chamber connected to the second side of the non-porous membrane such that the component exiting the non-porous membrane enters the exit chamber, and an evacuation member connected to the exit chamber for evacuating one or more components from within the exit chamber. U.S. Pat. No. 4,875,908 teaches a process for selectively separating water vapor from a multi-component gaseous mixture in which the multi-component gaseous mixture comprising the water vapor is passed along and in contact with a membrane which is selectively permeable to water vapor. The use of membranes for selective removal of one or more components of a gaseous mixture is also taught by U.S. Pat. No. 4,583,996 (inorganic porous membrane), U.S. Pat. No. 3,980,605 (fibrous semi-permeable membrane) and U.S. Pat. No. 3,735,559 (sulfonated polyxylylene oxide membranes).

Methods and apparatuses for selective removal of water vapor from a gaseous mixture and condensing the separated water vapor to recover its latent heat of vaporization are also known. U.S. Pat. No. 5,236,474 and related European Patent Application 0 532 368 teach a process for removing and recovering a condensable vapor from a gas stream by a membrane contactor in which a gas stream containing a condensable vapor is circulated on one side of hollow fiber membranes while cool extraction fluid is circulated on the other side under a total pressure differential. As a result, the condensable vapor in the gas stream is condensed in the gas stream and the condensed vapor, i.e. liquid, permeates the membrane and becomes entrained in the cool extraction fluid.

U.S. Pat. No. 4,466,202 teaches a process for recovery and reuse of heat contained in the wet exhaust gases emanating from a solids dryer or liquor concentrator by preferentially passing the vapor through a semi-permeable membrane, compressing the water or solvent vapor, and subsequently condensing the water or soluble vapor in a heat exchanger, thereby permitting recovery of its latent heat of vaporization for reuse in the evaporation process. It will be apparent to those skilled in the art that a substantial amount of energy will be required to compress the water or solvent vapor in accordance with the process of this patent. U.S. Pat. No. 5,071,451 teaches a vapor recovery system and process that permits condenser vent gas to be recirculated. The system includes a small auxiliary membrane module or set of modules installed across a pump and condenser on the downstream side of a main membrane unit, which module takes as its feed the vent gas from the condenser and returns a vapor-enriched stream upstream of the pump and condenser.

Notwithstanding these and other known methods and apparatuses for latent heat recovery, it will be appreciated by those skilled in the art that only a small fraction of available waste energy is recovered, particularly in the case of conventional heat exchanger-based condensers.

SUMMARY OF THE INVENTION

Accordingly, it is one object of this invention to provide a method and apparatus for recovering condensable components from a process stream, said method having improved energy efficiency over conventional methods and apparatuses.

This and other objects of this invention are addressed by a method for removing a condensable component from a process stream comprising the condensable component in which the first side of a permselective membrane is contacted with the process stream comprising the condensable component, the condensable component is passed through the permselective membrane to a second side of the permselective membrane, forming a condensable permeate, and the condensable permeate is contacted directly with a liquid stream comprising a liquid form of the condensable permeate at a temperature below that of the process stream, resulting in formation of a condensed permeate. The condensed permeate may then be returned to the process by which the process stream was generated.

The method of this invention may be carried out in an apparatus comprising a process stream conduit and a condenser disposed within the process stream conduit. The condenser comprises at least one wall enclosing a condenser chamber and forming at least one liquid stream inlet and at least one condensed permeate outlet. The wall of the condenser comprises a permselective membrane suitable for selectively passing at least one condensable component of a process stream flowing through the process stream conduit from the process stream, through the permselective membrane, and into the condenser chamber.

The essence of this invention is the use of the permselective membrane, which is a membrane that allows one condensable component to pass through selectively, forming a permeate stream, while substantially preventing other components from passing through, separation of the permeate stream comprising the vaporized state of that condensable component from the process stream, and immediately condensing the permeate by direct contact with a flowing, sprayed, or atomized liquid stream, also referred to herein as the condensing liquid, comprising the liquid form of the same condensable component as the permeate. The temperature of the process stream and the mass flow and/or temperature of the condensing liquid must be selected or regulated such that contact of the condensable component vapor with the condensing liquid removes a sufficient amount of heat from the vapor to permit condensation of a major portion of the permeate vapor. The latent heat of vaporization of the condensed portion of the component that passes through the membrane is then transferred to the condensed liquid stream as sensible heat. In this manner, energy is transferred from the process stream to the incoming condensing liquid stream and returned to the process very efficiently. The driving force for this transfer of heat and mass is the differential partial pressure of the condensable component across the membrane.

BRIEF DESCRIPTION OF THE DRAWINGS

This and other objects and features of this invention will be better understood from the following detailed description taken in conjunction with the drawings wherein.

DETAILED DESCRIPTION OF THE PRESENTLY PREFERRED EMBODIMENTS

This invention is a method for selectively removing water vapor or another condensable component from a process stream in a manner which allows recovery of its latent heat of vaporization. It also encompasses an apparatus designed to carry out this method. In the specific example where the process stream is flue gas from a boiler and the condensable component is water, the recovered water vapor is returned to the boiler as heated feed water. In general, the preferred temperature of the exiting liquid stream is at least 5° F. below the dew point of the condensable component of the process stream, and the incoming temperature of the process stream must be adjusted accordingly to a temperature at least about 5° F. above the dew point of the condensable component in the process stream.

Figure 1:
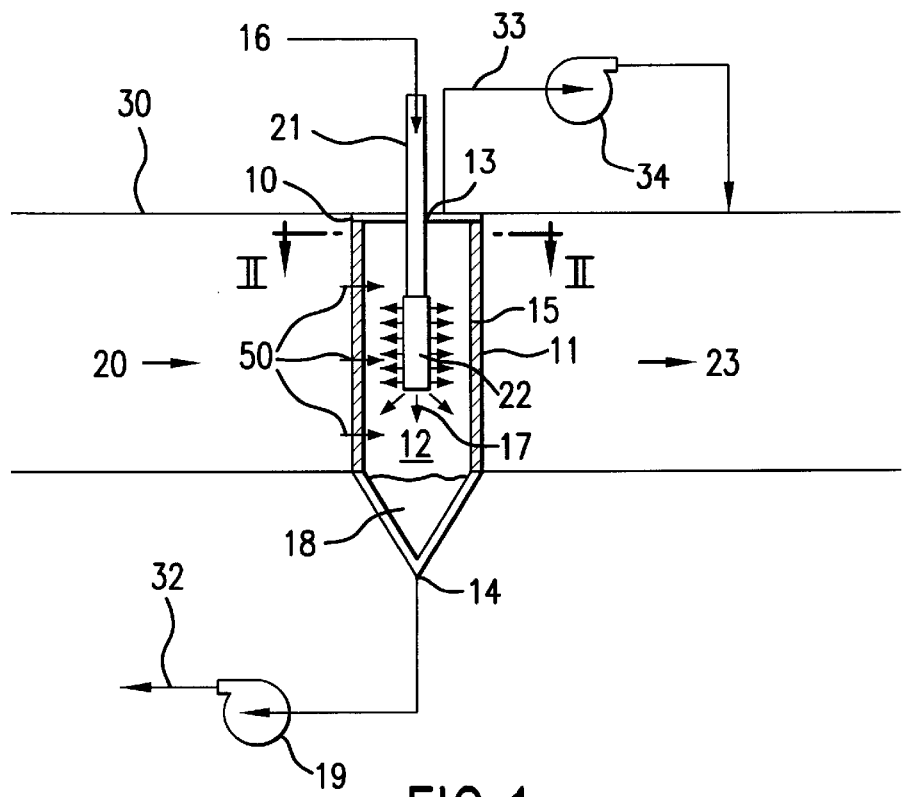
FIG. 1 is a schematic diagram of a lateral view of an apparatus for selective removal of a condensable component from a process stream with latent heat recovery in accordance with one embodiment of this invention.

FIG. 1 is a diagram showing an apparatus in accordance with one embodiment of this invention for carrying out the method of this invention. As shown, condenser 10 is disposed within process stream conduit 30 across a portion of the flow path of process gas stream 20. Condenser 10 comprises at least one condenser wall 11 enclosing a condenser chamber 12 and forming a condensing liquid inlet 13 and a condensed permeate outlet 14. At least a portion of condenser wall 11 comprises at least one permselective membrane 15 which selectively allows a portion of a desired condensable component of process gas stream 20 to pass through and into condenser chamber 12 as indicated by arrows 50. Although arrows 50 are pictured entering one side of condenser 10, it will be apparent to those skilled in the art that the flow of process gas stream 20 actually occurs on all sides of condenser 10. A liquid stream 16 of the condensable component at a lower temperature than that of process gas stream 20 is introduced into condenser 10 by means of condensing liquid inlet tube 21 extending through condensing liquid inlet 13. Condensing liquid inlet tube 21 comprises a condensing liquid distributor 22 through which liquid stream 16 is introduced into condenser chamber 12 as indicated by arrows 17. In accordance with one embodiment of this invention, liquid stream 16 is atomized prior to contacting said condensable permeate, forming liquid droplets having a size of less than or equal to about 100 micrometers in diameter. A portion of the condensable component of process gas stream 20 condenses through direct contact with liquid stream 16 in condenser chamber 12, increasing the amount of the condensable component inside condenser chamber 12 and raising its temperature by the transfer of latent enthalpy of vaporization to the sensible enthalpy of the condensed permeate 18, which collects in the lower portion of condenser chamber 12. The rapid condensation of vapor also creates a partial vacuum inside the enclosed vessel. The condensed permeate 18 is continuously removed from condenser chamber 12 through condensed permeate outlet 14 by means of condensate pump 19, resulting in pressurized condensed permeate 32, which is returned to the process (not shown). The portion of non-condensable gases 33 which passes through permselective membrane 15, if any, is removed by vacuum pump 34 and returned to conditioned process gas stream 23 downstream of condenser 10.

Figure 2:
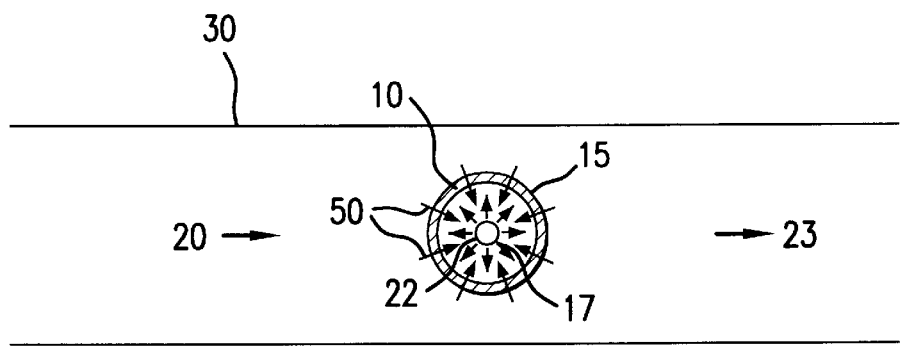
FIG. 2 is a view of the apparatus shown in FIG. 1 taken along the line II—II in accordance with one embodiment of this invention.
Figure 3:
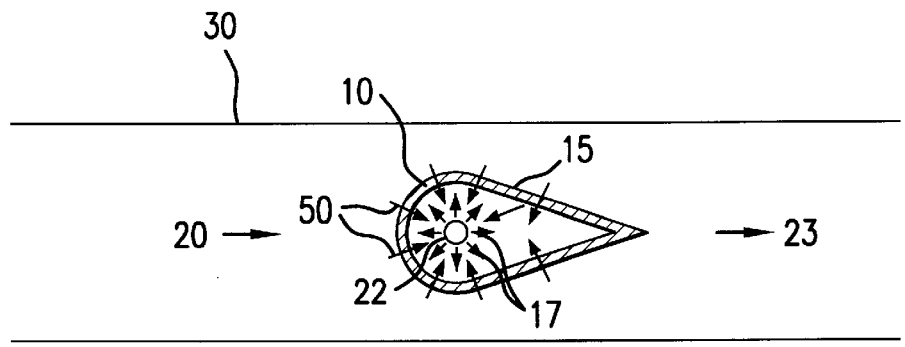
FIG. 3 is the same view of the apparatus shown in FIG. 2 in accordance with another embodiment of this invention.

As shown in FIG. 2, condenser 10 has a cylindrical configuration in accordance with one embodiment of this invention. In accordance with an alternative embodiment of this invention as shown in FIG. 3, the cross-section of condenser 10 has a wing shape to maximize the surface area in the upstream region of process stream conduit 30 where the partial pressure of the condensing component in process gas stream 20 is higher than in the downstream region of conditioned process gas stream 23. It is to be understood that FIGS. 2 and 3 set forth exemplary geometrical embodiments of condenser 10 and that there may be alternative condenser shapes consistent with the essential principles of this invention which are considered to be within the scope of this invention.

In accordance with one embodiment of this invention, an array of two or more condensers, substantially the same as shown in FIG. 1, are disposed in the process gas stream 20 with liquid inlets and outlets connected in parallel.

Figure 4:
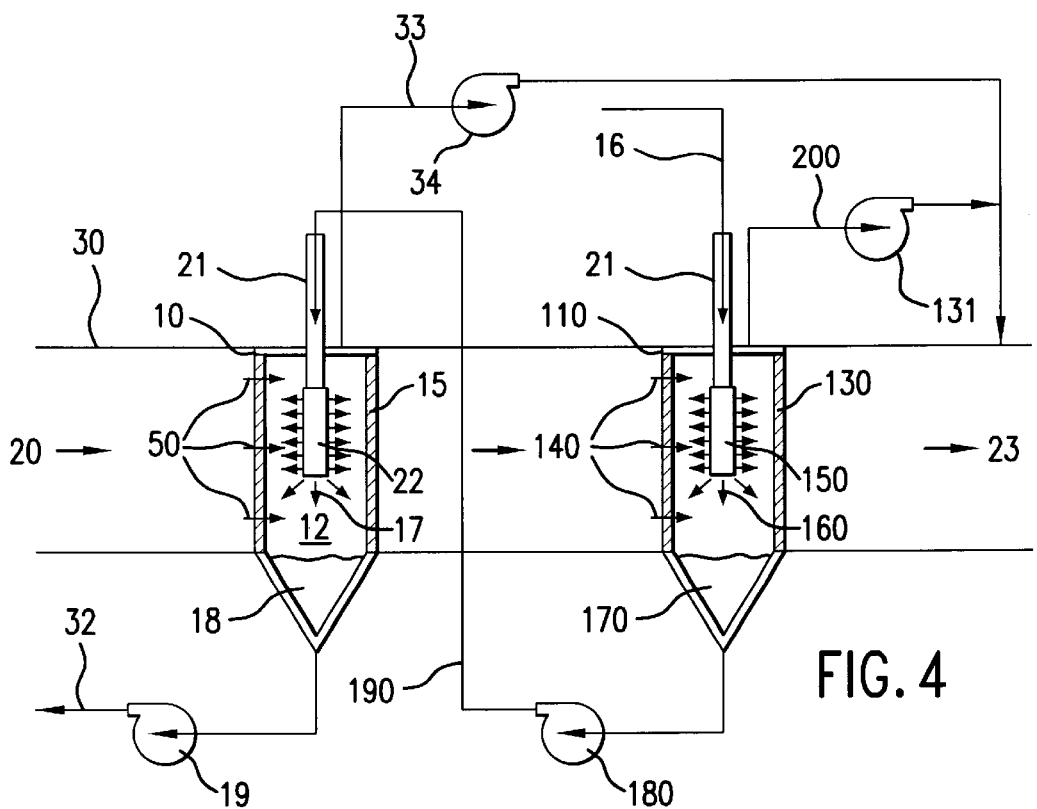
FIG. 4 is a schematic diagram of a lateral view of an apparatus for selective removal of a condensable component from a process stream with latent heat recovery employing a two-stage condenser in accordance with another embodiment of this invention.

A further embodiment of this invention is shown in FIG. 4 in which an array of two or more condensers comprising a plurality of countercurrent stages are employed. In the exemplary embodiment shown in FIG. 4, a second-stage condenser 110 is disposed downstream of condenser 10 and extracts a portion of the condensable component from process gas stream 20 which has been partially depleted of the condensable component by contact with condenser 10. A portion of the remaining condensable component contained in process gas stream 20 passes through membrane 130 as indicated by arrows 140 and condenses in contact with incoming condensing liquid stream 16 that has been dispersed through distributor 150 as indicted by arrows 160. The condensed permeate 170, which contains the condensable component from process gas stream 20 that has passed through membrane 130 and mixed with condensing liquid stream 16 and is at a temperature higher than that of condensing liquid stream 16 but lower than that of stream 140, is repressurized and conveyed by pump 180, constituting liquid stream 190 that enters condenser 10 through inlet pipe 21. Non-condensable gases that pass through membrane 130 are extracted as stream 200 by vacuum pump 131 and returned to the process stream downstream of the second-stage condenser 110. Condenser 10 then constitutes the first stage of the two-stage apparatus and performs essentially as in the embodiment shown in FIG. 1.

Figure 5:
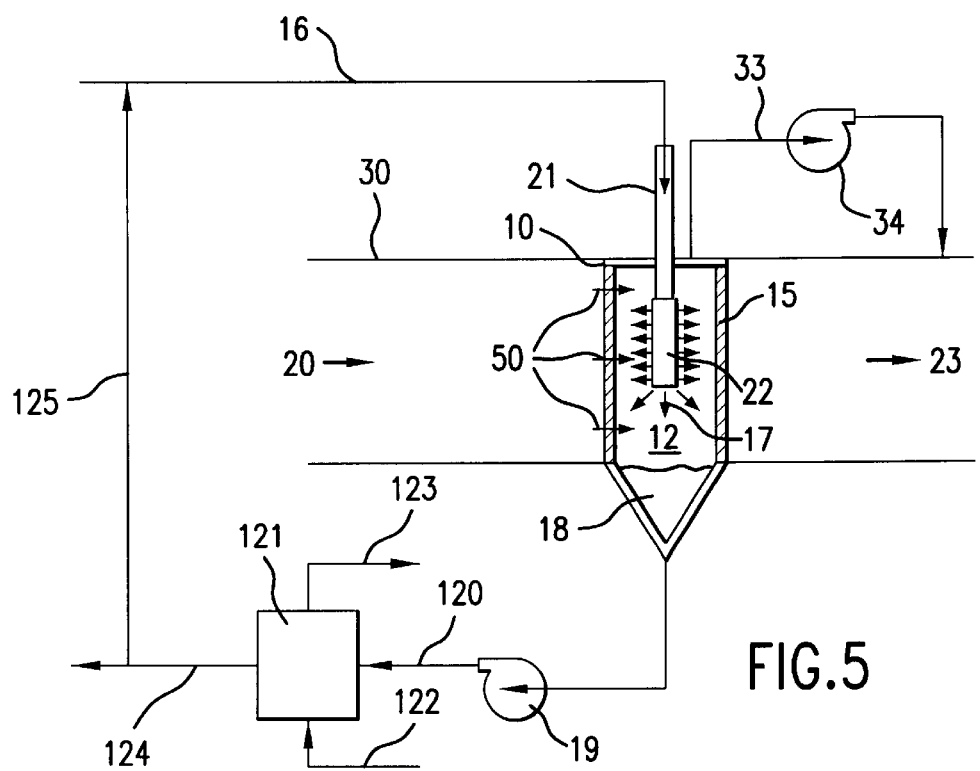
FIG. 5 is a schematic diagram of a lateral view of an apparatus for selective removal of a condensable component from a process stream with latent heat recovery employing a liquid-gas heat exchanger in accordance with another embodiment of this invention.

In accordance with one embodiment of this invention as shown in FIG. 5, a portion of the heat is transferred from exiting high-temperature condensed permeate 120 to another process stream (gaseous or liquid) by means of an indirect heat exchanger 121. Heat is thereby transferred to process stream 122, raising its temperature and creating heated process stream 123. A portion 125 of the cooled liquid stream 124 exiting heat exchanger 121 can be combined with condensing liquid stream 16 for recycle to the condenser inlet. In one specific example in which the condenser is installed as part of a steam boiler energy recovery system, the condensed liquid is water and the gaseous process stream is combustion air.

Figure 6:
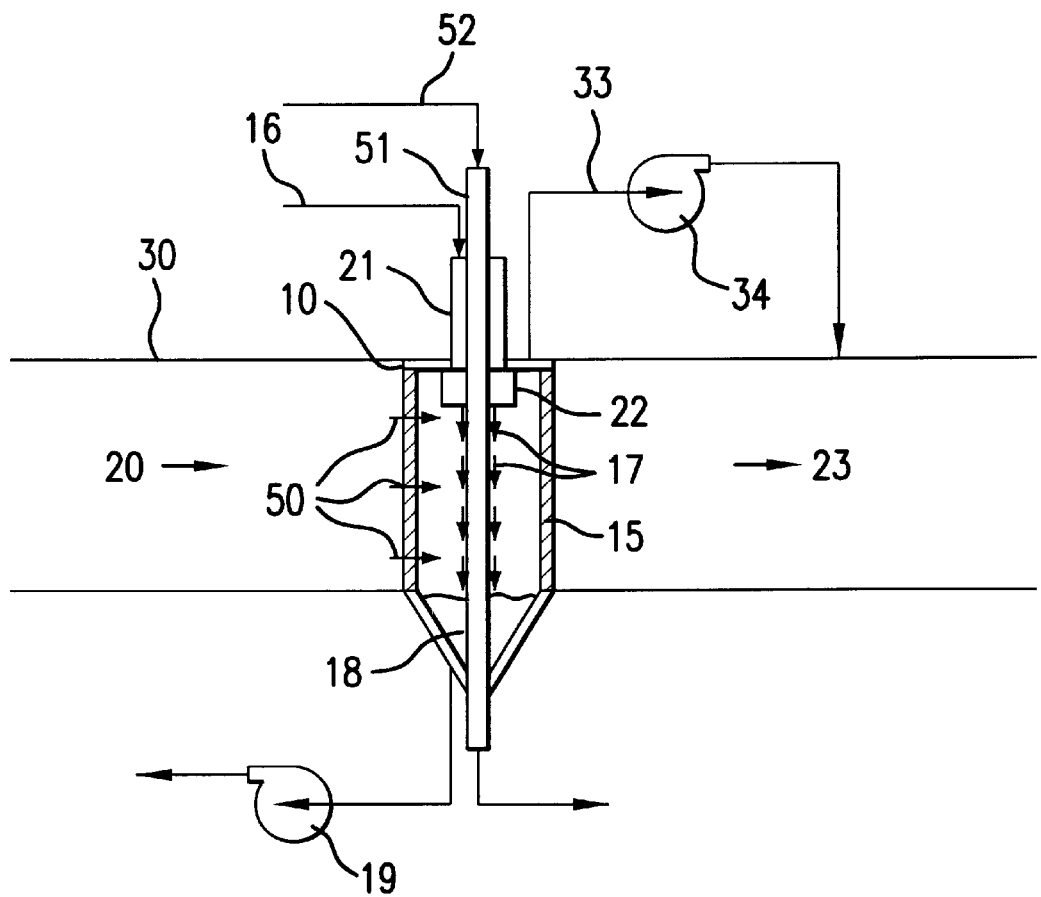
FIG. 6 is a schematic diagram of a lateral view of an apparatus for selective removal of a condensable component from a process stream with latent heat recovery employing an indirect liquid-gas heat exchanger in accordance with another embodiment of this invention.

A further embodiment of this invention comprising an indirect heat transfer element is shown in FIG. 6. There, the condensing liquid stream 16 is sprayed directly onto the surface of duct 51 which passes through condensing liquid inlet tube 21, condensing liquid distributor 22, and the interior of condenser 10, forming a liquid film on the outer surface of duct 51. Process stream 52 flows through the inside of duct 51 and heat is transferred by conduction from the outer surface of duct 51 to process stream 52. The preferred direction of flow of process stream 52 is co-current with the flow of condensing liquid stream 16. This method increases the amount of heat recovered from process gas stream 20 and reduces the temperature of condensed permeate 18, thereby reducing its vapor pressure and increasing the driving force for permeation through the membrane. As in the embodiment shown in FIG. 5, a specific example of this embodiment is a condenser to remove water vapor from flue gas, wherein process stream 52 comprises combustion air.

EXAMPLE

This example involves the removal of water vapor from a flue gas stream produced by natural gas combustion in a boiler. The conditions of the incoming flue gas to the condenser are as follows:

| | |
|---|---|
| Temperature | 155° F. |
| Pressure | 1.006 atm |
| Dew point | 136° F. |
| Mass flow | 4,188 lb/h |
| Enthalpy | 627,100 Btu/h (reference temp. = 60° F.) |

31.3% of the flue gas water vapor is passed selectively through a permselective membrane into the inner chamber of the apparatus, in which it contacts incoming liquid water. The incoming liquid water stream conditions are:

| | |
|---|---|
| Temperature | 75° F. |
| Pressure | >0.285 atm |
| Mass flow | 3,746 lb/h |
| Enthalpy | 56 Btu/h |

The flue gas passing over the apparatus surface is dried, reducing its volume and dew point. The exiting flue gas conditions are:

| | |
|---|---|
| Temperature | 155° F. |
| Pressure | 1.006 atm |
| Dew point | 124° F. |
| Mass flow | 4,034 lb/h |
| Enthalpy | 457,000 Btu/h |

The liquid water stream exiting the apparatus is increased in temperature and mass flow, having its mass increased by the amount of water vapor condensed from the flue gas. This water is returned to the boiler as boiler feed water. The exiting liquid water stream conditions are:

| | |
|---|---|
| Temperature | 118° F. |
| Pressure | 0.285 atm |
| Mass flow | 3,901 lb/h |
| Enthalpy | 226,200 Btu/h |

In this way, 226,144 Btu/h of energy and 154 lb/h of water are transferred from the flue gas to the boiler feed water stream, improving the overall energy efficiency of the process. This same degree of energy recovery from flue gas using conventional indirect heat exchangers would require extremely large condenser surface area, and the condenser would be-subject to corrosion unless costly corrosion-resistant materials of construction are used. In addition, even if the condensed water could be recovered and its sensible heat could be returned to the process, that water could not be used as boiler feed water without extensive cleaning and conditioning. In the conventional system, the condensate must be disposed of as wastewater, which may contain corrosive or environmentally undesirable components. In this invention, the condensed water can be used directly as boiler feed water because it passes through the membrane in a pure state.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method for removing a condensable component from a process stream comprising said condensable component comprising the steps of:

contacting a first side of a permselective membrane with said process stream comprising said condensable component;

passing said condensable component through said permselective membrane to a second side of said permselective membrane, forming a condensable permeate on said second side of said permselective membrane; and directly contacting said condensable permeate with a liquid stream comprising a liquid form of said condensable permeate, forming a condensed permeate on said second side of said permselective membrane.

2. A method in accordance with claim 1, wherein said process stream has a temperature above a dew point of said condensable component.

3. A method in accordance with claim 1, wherein a latent heat of vaporization of said condensed permeate is returned to a process generating said condensable component of said process stream.

4. A method in accordance with claim 3, wherein said process stream comprises flue gas from a boiler, said condensable component is water vapor, and said condensed permeate is returned to said boiler as feed water.

5. A method in accordance with claim 1, wherein said condensable component is water vapor.

6. A method in accordance with claim 1, wherein said process stream is flue gas from a combustion process.

7. A method in accordance with claim 1, wherein said liquid stream is atomized prior to contacting said condensable permeate, forming liquid droplets having a size one of less than and equal to about 100 micrometers in diameter.

8. A method in accordance with claim 1, wherein a partial pressure of said condensable component on said first side of said permselective membrane is greater than the partial pressure of said condensable component on said second side of said permselective membrane.

9. A method for recovery of latent heat of vaporization comprising the steps of:

passing a condensable material through a permselective membrane from a first side of said permselective membrane to a second side of said permselective membrane, producing a condensable permeate on said second side of said permselective membrane; and contacting said condensable permeate with a liquid stream comprising a liquid form of said condensable permeate, resulting in condensing of said condensable permeate, forming a condensed permeate and recovery of said latent heat of vaporization of said condensed condensable permeate.

10. A method in accordance with claim 9, wherein a partial pressure of said condensable material is greater than a partial pressure of said condensable permeate.

11. A method in accordance with claim 9, wherein said condensable material is at a temperature above a dew point of said condensable material.

12. A method in accordance with claim 9, wherein said liquid stream is atomized prior to contacting said condensable permeate, forming liquid droplets having a size one of less than and equal to about 100 micrometers in diameter.

13. A method in accordance with claim 9, wherein said condensed permeate is returned to a process generating said condensable material.

14. An apparatus comprising:

a process stream conduit;

a first condenser disposed within said process stream conduit, said first condenser comprising at least one wall enclosing a condenser chamber and forming at least one liquid stream inlet and at least one condensed permeate outlet, said at least one wall comprising a permselective membrane suitable for selectively passing at least one condensable component of a process stream from said process stream conduit into said condenser chamber; and at least one additional condenser disposed within said process stream conduit and having at least one additional condenser liquid stream inlet and at least one additional condenser condensed permeate outlet, said at least one additional condenser condensed permeate outlet of said at least one additional condenser in fluid communication with said at least one liquid stream inlet of said first condenser.

15. An apparatus in accordance with claim 14, wherein said condenser chamber has a cylindrical configuration.

16. An apparatus in accordance with claim 14, wherein said condenser chamber has a wing shape.

17. An apparatus in accordance with claim 14, wherein said permselective membrane is disposed at an angle with respect to a longitudinal axis of said process stream conduit.

18. An apparatus in accordance with claim 14, wherein a liquid stream conduit is disposed within said liquid stream inlet and extends into said condenser chamber.

19. An apparatus in accordance with claim 18 further comprising an indirect heat transfer element.

20. An apparatus in accordance with claim 19, wherein said indirect transfer element comprises a process stream conduit disposed within said liquid stream conduit and extending through said condenser chamber, said process stream conduit having an upstream end proximate said liquid stream inlet and a downstream end proximate said condensed permeate outlet.

* * * * *